United States Patent [19]

Jackson

[11] Patent Number: 4,487,478
[45] Date of Patent: Dec. 11, 1984

[54] LASER PROTECTION DEVICE
[75] Inventor: Robert E. Jackson, Mission Viejo, Calif.
[73] Assignee: PDA Engineering, Santa Ana, Calif.
[21] Appl. No.: 347,349
[22] Filed: Feb. 9, 1982
[51] Int. Cl.$^3$ ................................................ G02B 5/26
[52] U.S. Cl. ........................ 350/622; 350/316; 350/317; 356/352
[58] Field of Search ............... 350/164, 166, 290, 301, 350/316, 317, 1.6; 356/352

[56] References Cited

U.S. PATENT DOCUMENTS

| | | | |
|---|---|---|---|
| 3,267,807 | 3/1964 | Swope et al. | 88/112 |
| 3,498,693 | 3/1970 | Fein et al. | 350/166 |
| 3,792,916 | 2/1974 | Sarna | 350/316 |
| 4,088,884 | 5/1978 | Rast et al. | 350/316 |

FOREIGN PATENT DOCUMENTS 103060 8/1979 Japan ................................. 350/290

OTHER PUBLICATIONS

Knittl, *Optics of Thin Films*, Wiley-Interscience Publishing, 1976, pp. 86 to 88, 148 to 151.

Primary Examiner—John K. Corbin
Assistant Examiner—William Propp
Attorney, Agent, or Firm—Gordon L. Peterson

[57] ABSTRACT

A laser protection device comprising a plurality of edge filters for receiving an incident beam and progressively separating the desired optical energy from the laser energy contained in the beam. The first edge filter receives the incident beam and provides a first reflected beam and a first transmitted beam. One of the beams provided by the edge filter comprises a relatively high percent of desired optical energy and the other of the beams provided by the edge filter comprises a relatively high percentage of laser energy. The other edge filters are arranged in series to similarly progressively reduce the percentage of laser energy contained in the beam.

8 Claims, 5 Drawing Figures

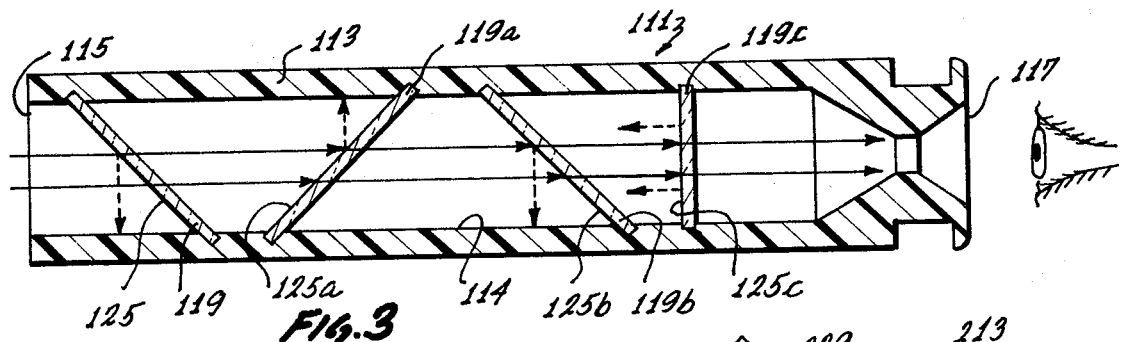
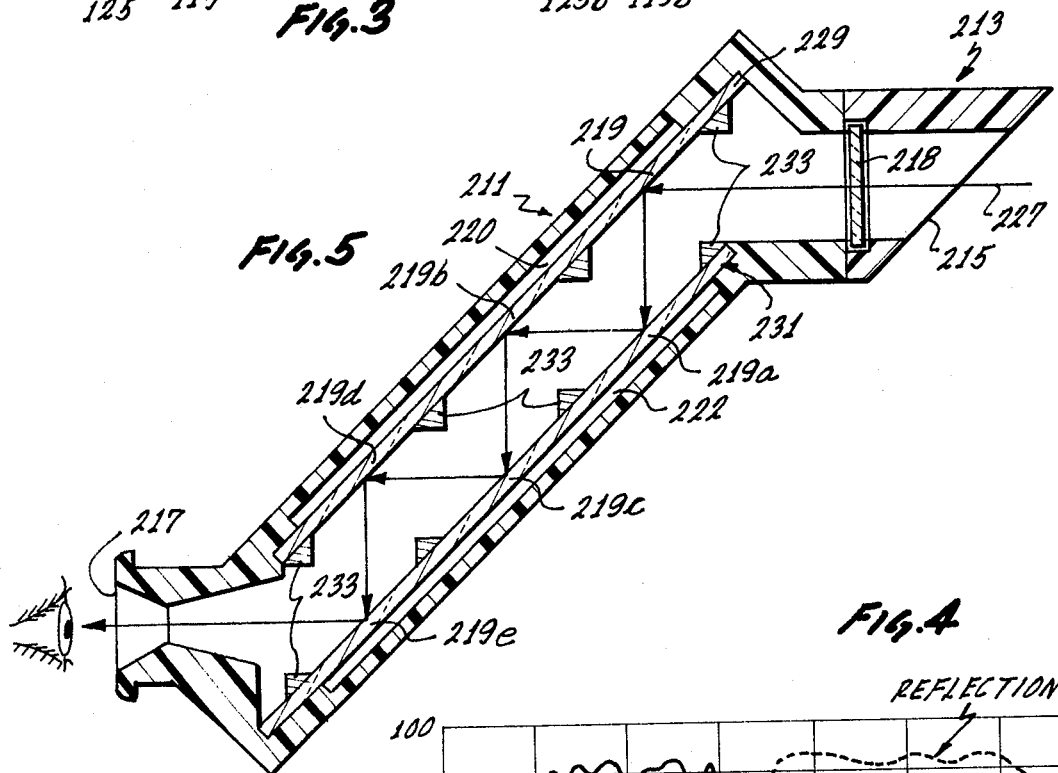
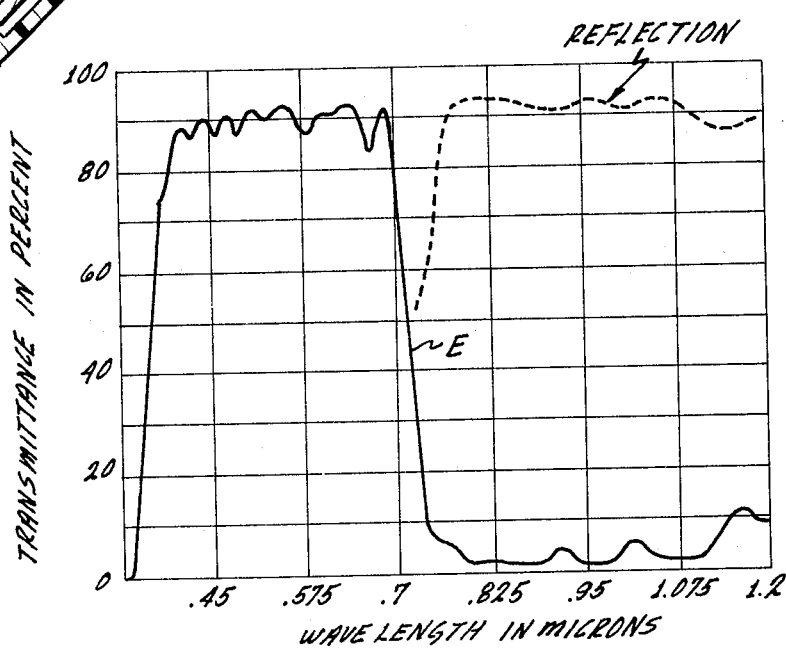

LASER PROTECTION DEVICE

BACKGROUND OF THE INVENTION

Lasers characteristically emit radiation at a single wavelength or over an extremely narrow band of wavelengths. For example, laser emissions can be caused to occur at wavelengths of approximately 250,350,353,530,690,1060,1300,2750,3800,5300 and 10600 nanometers (nm). Thus, the visible range is typically considered to be from 400 to about 700 nm. Laser radiation at approximately 690 nm wavelength, while technically in the range commonly regarded as the visible range, is, for definition purposes herein, regarded as in the boundary layer between the visible and infrared spectrums. Thus of these examples, only the laser radiation at 530 nm is within the central range of the visible spectrum.

Lasers have numerous applications, including military uses such as in range finders and in weapon guidance systems. Unfortunately, however, the intensity of a laser beam is frequently so strong that it can damage the human eye or photosensitive equipment that receives it.

Various protective devices have been proposed for separating harmful laser energy wavelengths from non-harmful or desired optical energy wavelengths, i.e., ultraviolet, visible and infrared wavelengths. For example, it has been proposed to remove laser energy using a single glass substrate having multiple dielectric coatings. As more coatings are applied, greater percentages of the laser energy are removed, but the visible radiation losses increase very rapidly. Thus, as a practical matter, a single glass substrate with coatings generally cannot remove more than a few orders of magnitude of the laser energy without incurring significant visible spectrum losses.

Sarna U.S. Pat. No. 3,792,916 discloses an optical filter assembly adapted to remove laser energy in the central range of the visible spectrum. This filter assembly comprises multiple Fabry-Perot type filters which have several disadvantages. For example, a Fabry-Perot filter is a multilayer film and spacer assembly that must be extremely accurately controlled as to thickness. This significantly increases the cost of the Fabry-Perot filter.

Of perhaps greater importance is the fact that the most common battlefield laser provides laser radiation at a wavelength of 1060 nm. The characteristics of the Fabry-Perot filter of the Sarna patent are desirable for removing mid-visible spectrum laser energy from a visible optical path but are totally unsuited for use in protecting a visible path from laser emissions of wavelengths outside the central range of the visible spectrum. Specifically, a Fabry-Perot type filter acts as a narrow band filter which transmits laser radiation in this narrow band and reflects all other radiation. Alternatively, when considering the reflectance curve, the Fabry-Perot filter acts as a notch filter. Immediately outside of the notch, reflectance is high but the reflectance curve droops, i.e., the percent of reflection drops off as distance from the notch increases. This is acceptable when the notch is near the center of the visible range because, in this event, no significant reduction in reflection occurs within the visible range. However, if a Fabry-Perot type filter were used to exclude laser radiation outside the visible range or in the boundary layer visible range, the region of reduced reflection would span all, or a part of, the visible range thereby excluding substantial quantities of visible radiation. This is, of course, unacceptable and means that the Sarna Fabry-Perot filter assembly is not usable to exclude non-visible laser emissions, such as the 1060 nm laser rangefinder commonly used on the battlefield, from a visible optical path.

Finally, the Fabry-Perot filters are very sensitive to thermal changes and changes in the angle of incidence. As a result, the notch in the reflectance curve shifts somewhat with thermal changes and angular deviations, and this can cause the Fabry-Perot filter assembly to exclude insufficient percentages of the laser energy.

SUMMARY OF THE INVENTION

This invention solves the problems noted above by utilizing an assembly of edge filters which efficiently preserves the desired optical energy wavelengths while effectively excluding lase energy. Edge filters also have the advantage of being relatively inexpensive when compared with Fabry-Perot filters. The desired optical energy wavelengths which are preserved can be in the ultraviolet, visible or infrared.

In one preferred form, the invention preserves the visible and excludes laser energy of wavelengths outside the primary visible range. For purposes of description of this invention, the primary visible range is defined as all wavelengths from 420 nm to 680 nm. Thus, this form of the invention is particularly adapted for excluding laser energy at various wavelengths outside the visible range, as well as a wavelength of 690 nm. This invention, unlike the Fabry-Perot filter assembly, can accomplish this result with minimum degradation of the visible energy.

An edge filter functions via optical interference and either transmits or reflects a high percent of the energy in a relatively broad band of wavelengths on one side of an edge or transition zone and, conversely, reflects or transmits a high percentage of the energy in a relatively broad band of wavelengths on the other side of such transition zone. For example, an edge filter might reflect a high percent of the energy in the visible spectrum and transmit a high percent of energy having wavelengths from 0.7 micron to 1.2 microns. The transition between the wavelengths which are highly reflected and those which are highly transmitted is generally rather abrupt and occurs over a relatively narrow band of wavelengths. Thus, as viewed on a transmittance versus wavelength curve, the transition zone would be represented by a relatively steep, nearly vertical line or edge.

Edge filters can be contrasted with notch filters which may reflect radiation over a relatively broad band of wavelengths, except for a relatively narrow notch defined by a narrow band of wavelengths in which the energy is transmitted. A Fabry-Perot filter is a type of notch filter. With an edge filter, broad bands of wavelengths on one side of a transition zone, which may be very narrow, are separated from a broad band of wavelengths on the other side of the transition zone.

Structurally, an edge filter may comprise a plurality of dielectric thin layers coated on a suitable substrate to provide the desired transmittance and reflection characteristics. Edge filters are discussed, for example, in McLeod, THIN-FILM OPTICAL FILTERS, American Elsevier Pub. Co., Inc., N.Y. 1969, at pages 112 et seq. An edge filter is less expensive than a Fabry-Perot filter.

This invention utilizes edge filters having particular transmittance and reflectance characteristics. Specifically, the edge filters employed have the edge or transition zone located between the optical energy which it is desired to preserve and the laser energy which it is desired to exclude. For example, an edge filter of the type used with this invention may have a characteristic of 98 percent reflectivity in the visible range and 90 percent transmissibility at the laser wavelength, outside the visible range, which it is desired to exclude. Of course, if the laser protection device of this invention is to be used to exclude laser energy at a wavelength of 0.69 micron, the transition zone or edge of the filter preferably lies in the visible range so that all of the laser energy is excluded. This, of course, results in some loss of visible energy near the infrared spectrum. Of course, the edge of the filter can be placed in the infrared, visible or ultraviolet spectrums between the optical energy which is to be preserved and the optical energy which is to be excluded.

To obtain maxiumum removal of laser energy with minimum degradation of the desired optical energy through the application of numerous additional layers, the laser energy is removed in stages using two or more edge filters arranged in series. With this arrangement, a first of the filters receives the incident beam and provides a first reflected beam and a first transmitted beam. One of the beams provided by this filter comprises a relatively high percentage of the desired optical energy wavelengths and a reduced percentage of the laser energy wavelengths. The other of the beams provided by this filter contains some of the laser energy wavelengths and a relatively low percentage of the desired optical energy wavelengths. The beam which comprises a relatively high percentage of the desired optical energy wavelengths is received by a second of the filters. The second filter similarly separates the desired optical energy from the laser energy in the beam incident upon it. Additional filter stages may be provided as desired to further reduce the laser energy in the output beam.

The filters may either reflect the laser energy and transmit the useful energy or reflect the useful energy and transmit the laser energy.

To prevent the laser energy from causing damage, the laser energy separated out of the incoming beam may be absorbed by a suitable absorber. The beam having substantially all of the laser energy removed from it can be suitably directed through an exit aperture or eyepiece of the protective device for utilization.

In one form of the invention where at least three filters are used in series, the first and third filters are co-planar, and a darkened separator is provided between the first and third filters. This enables the first and third filters to be provided on a single integral mirror with the separator optically dividing the mirror to define the first and third filters. The darkened separator prevents interference between the adjacent images.

The invention, together with additional features and advantages thereof, may best be understood by reference to the following description taken in connection with the accompanying illustrative drawing.

BRIEF DESCRIPTION OF THE DRAWING

FIG. 3 is a sectional view of a second form of laser protection device in which the visible energy is transmitted and the laser energy is reflectance.

FIG. 4 is a transmittance/reflectance plot for the filters shown in FIG. 3 with the abscissa on a linear scale.

FIG. 5 is an axial sectional view of a third embodiment of the laser protection device.

DESCRIPTION OF THE PREFERRED EMBODIMENT

Figure 1:
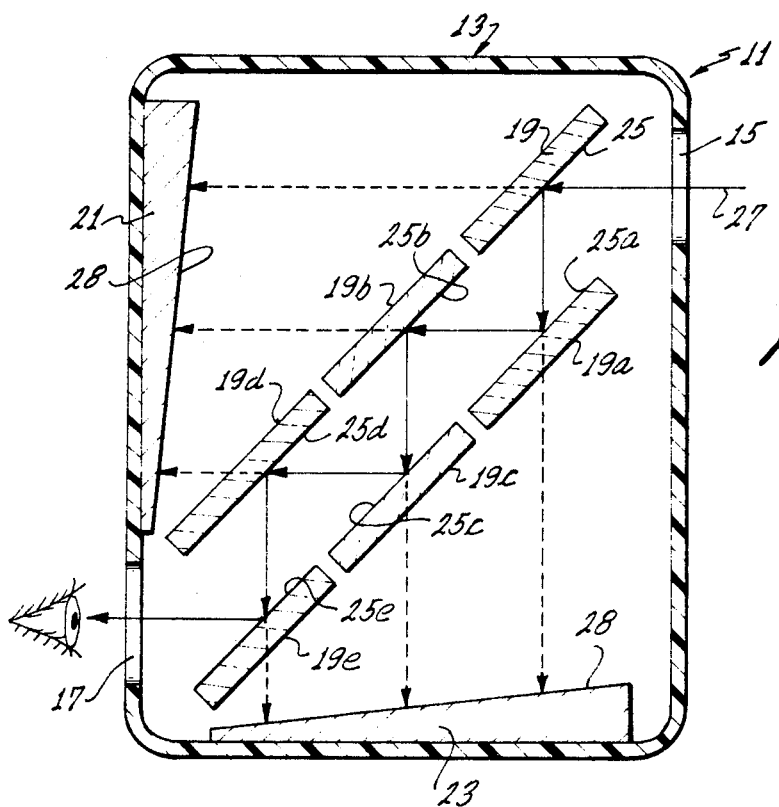
FIG. 1 is a somewhat schematic sectional view taken through a laser protection device constructed in accordance with the teachings of this invention.

FIG. 1 shows a laser protection device 11 which comprises a housing 13 of a suitable material, such as metal or plastic, which provides a complete enclosure, except for an entrance aperture 15 and an exit aperture 17. Six multi-layer dielectric edge filters 19,19a,19b,19c,19d and 19e are mounted within the housing 13. Of course, other numbers of the filters can be provided, and six filters are illustrated purely by way of example. Energy absorbers 21 and 23 are mounted on the side and lower walls, respectively, of the housing 13 for receiving laser energy transmitted by the filters 19,19b,19d and 19a,19c and 19e, respectively.

Figure 2:
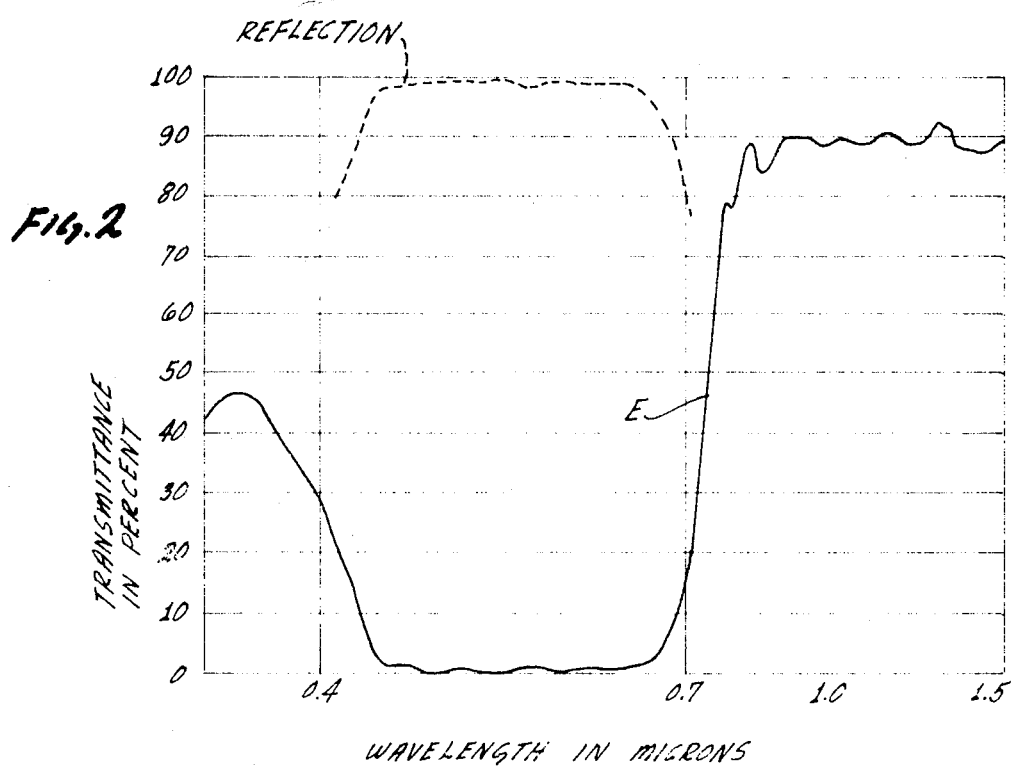
FIG. 2 is a plot showing percent transmittance and reflectance versus wavelength for each of the filters shown in FIG. 1, with the abscissa on a nonlinear scale.

Functionally, each of the filters 19 reflects a relatively high percentage of visible energy and tramsmits a relatively high percentage of laser energy outside the primary visible range. Substantially, none of the energy received by the filters is absorbed in the filters. Hence, the radiant tramsmittance and the radiant reflectance add up to nearly 100%. FIG. 2 shows, by way of example in a solid line, a typical transmittance curve for each of the filters shown in FIG. 1, and in a dashed-line a typical reflection curve for each of the filters of FIG. 1. Filters having characteristics as shown in FIG. 2 may be used to separate visible energy from laser energy at various wavelengths in the infrared spectrum. For example, each of the filters may have an average reflectance of 98 percent from 0.45 micron to 0.65 micron and an average transmittance from 0.8 micron to 1.2 micron of about 90 percent. Thus, filters having the characteristic shown in FIG. 2 could be used, for example, to separate laser energy at 1.06 micron from visible radiation. By way of example, each of the filters may be a heat/light separation filter of the type available from GM Vacuum Coating Lab of Newport Beach, Calif., as a 45-degree cold mirror or a 45-degree cold mirror on Pyrex. More specifically, the solid line tansmittance curve shown in FIG. 2 has a relatively steep edge E which effectively separates the visible and near infrared spectrums. The edge E is relatively steep to provide a rapid transition between a broad band zone where transmittance is low and a broad band zone where transmittance is high.

The filter 19, which may be considered as an entrance filter, has a reflective surface 25 arranged to define a 45-degree angle with the axis 27 of an incident beam, which may be considered as containing harmful laser energy at 1.06 micron wavelength and the usual ambient visible wavelengths. The filter 19 reflects a high percent of the visible wavelengths to the filter 19a and transmits a high percent of the laser energy wavelengths to the energy absorber 21 in accordance with the curves of FIG. 2.

In the embodiment illustrated, the filter 19a has a reflective surface 25a arranged at a 45-degree angle with respect to the beam incident upon it. The filter 19a reflects a high percentage, preferably substantially all, of the visible energy to a reflective surface 25b of the filter 19b and transmits a high percentage of the laser energy received by it to the energy absorber 23 in accordance with the curves of FIG. 2.

The filter 19d has a reflective surface 25d, and the filters 19c and 19e have reflective surfaces 25c and 25e, respectively. As shown in FIG. 1, the surfaces 25, 25b and 25d are coplanar, and the surfaces 25a, 25c and 25e are also coplanar and arranged parallel to the surface 25. Each of the filters 19b–19e performs a similar filtering or separating function. Accordingly, beams containing progressively high percentages of visible energy and progressively lower percentages of laser energy are reflected by the surfaces 25b, 25c, 25d and 25e. The exit beam is reflected by the surface 25e through the exit apertures 17 to the eye of the observer or to photosensitive equipment.

The laser energy transmitted by the filters 19, 19b and 19d is transmitted to the energy absorber 21, and the laser energy transmitted by the filters 19a, 19c and 19e is transmitted to the energy absorber 23. Each of the energy absorbers 21 and 23 may be constructed of material suitable for absorbing laser energy, such as carbon, and has an inclined surface 28 to reduce any laser reflections back into the system. The thickness of each of the energy absorbers 21 and 23 progressively reduces toward the exit aperture 17 because the amount of laser energy that it receives from each of the filters progressively reduces toward the exit aperture 17.

By way of example, if the filters had a 98 percent reflectivity in the visible region and a 90 percent transmissibility at a wavelength of 1.06 micron, then for every unit of laser energy received through the entrance aperture 15, 0.000001 unit of laser energy would be reflected through the exit aperture 17 and about 88 percent of the visible energy entering the entrance aperture 15 would pass through the exit aperture 17. Thus, the laser energy is reduced by six orders of magnitude while the visible energy is reduced by only about 12 percent.

FIG. 3 shows a laser protection device 111. Except to the extent shown or described herein, the device 111 is identical to the device 11, and portions of the device 111 correspondingly to portions of the device 11 are designated by corresponding reference characters preceded by the numeral "1". The laser protection device includes an elongated tubular housing 113 having an axial passage 114 extending from an entrance aperture 115 to an exit aperture 117. Edge filters 119, 119a, 119b and 119c are mounted in axial alignment in the housing 13.

The primary functional difference between the laser protective devices 11 and 111 is that, with the latter, the filters transmit a high percentage of the visible radiation and reflect a high percentage of the laser radiation in accordance with the curves shown by way of example in FIG. 4. Thus, a high percentage of the visible energy in the incident beam is transmitted in series through the filters 119, 119a, 119b and 119c to the exit aperture 117 with relatively high percentages of the laser energy at, for example, a wavelength of 1.06 micron incident upon each of these filters being reflected. Of course, the reflected laser energy may be at any wavelength outside the primary visible range, although the particular filter characteristics of FIG. 4 are not suited for separating laser energy at 0.69 micron.

More specifically with reference to FIG. 4, the transmittance curve has a relatively steep edge E which separates a broad band zone where transmittance is high from a broad band zone where transmittance is low. For the curve of FIG. 4, transmittance is high throughout the visible range and low in the infrared range. The percentages of reflection and transmittance essentially vary inversely in that negligible amounts of energy are absorbed by the filter. By way of example, filters having a characteristic of the type shown in FIG. 4 may be purchased from OCLI of Santa Rosa, Calif., as a form of heat/light separation filter referred to as a wideband hot mirror.

The filter 119c has a reflective surface 125c which is perpendicular to the axis of the incident beam and to the axis of the passage 114. Thus, the laser energy reflected by this filter is reflected axially away from the exit aperture 117.

The filters 119, 119a and 119b have reflective surfaces 125, 125a and 125b, respectively, which are inclined in this case at 45 degrees to the axis of the incident beam and to the axis of the housing 113. Thus, laser energy from these three filters is reflected toward the peripheral wall of the housing 13. In addition, laser energy reflected axially from the filter 119c is reflected by the filter 119b toward the peripheral wall of the housing 113. The peripheral wall of the housing is preferably constructed of material which can accommodate and absorb this laser energy.

Because the filters 119a and 119b are angularly disposed in the housing, they have coatings which are different from the coatings on the filters 119 and 119c, and appropriate coatings and filters can be selected by those skilled in the art. The four filters shown in FIG. 3 are shown by way of example inasmuch as any number of filtering stages can be employed.

FIG. 5 shows a laser protection device 211 which is identical to the laser protection device 11, except to the extent shown or described herein, and portions of the device 211 corresponding to portions of the device 11 are designated by corresponding reference characters preceded by the numeral "2". The primary difference is that, with the laser protection device 211, filters 219, 219b and 219d are integrally formed on a single integral mirror 229, and the filters 219a, 219c and 219e are integrally formed on a single mirror 231. Darkened separators 233 are provided on the mirrors 229 and 231 to divide the mirrors to define the ends of each of the filters and to avoid interference between adjacent filters. Each of the filters in the laser protection device of FIG. 5 may have filtering characteristics in accordance with FIG. 2.

Structurally, the laser protection device 211 includes a housing 213 having an entrance aperture 215, an exit aperture 217 and a transparent entrance member 218 of plain glass or the like. The mirrors 229 and 231 are separated from the peripheral wall of the housing 213 to define gaps 220 and 222, respectively. The mirror 229 defines an angle of 45 degrees with the axis 227 of the incoming incident beam, and the mirror 231 is parallel to the mirror 229. Thus, a beam is reflected through the laser protection device 211 in the same manner described above with reference to FIG. 1. The transmitted laser energy is transmitted through each of the filters 219 to the peripheral wall of the housing 213 which absorbs such laser energy. If desired, special energy absorbers can be provided; however, for laser energy of lesser intensities, no special energy absorber is required. In this embodiment, as well as other illustrated embodiments of the invention, the laser energy being removed is outside the primary visible range and is presumed to be at 0.69 micron or above.

In some instances, it may be necessary or desirable to separate visible energy from laser energy at two or more different wavelengths. In some instances, it may be possible to do this by using identical filters at each stage. However, depending upon the characteristics of the filter employed, it may be desirable to accomplish this objective utilizing filters having different characteristics, and this is one more advantage of achieving laser protection in multiple stages. For example, with reference to the form shown in FIG. 1, the filters 19, 19b and 19d may be adapted to separate visible energy from laser energy at a first wavelength and the filters 19a, 19c and 19e may be particularly adapted for separating visible energy from laser energy at a second wavelength. In this illustration, the energy reflected by the filter 19 would include a high percentage of visible energy, a small percentage of laser energy at the first wavelength and a higher percentage of laser energy at the second wavelength. Conversely, the beam tramsmitted by the filter 19 would include substantially none of the visible energy, a high percentage of the laser energy at the first wavelength and a lower percentage of the laser energy at the second wavelength. The filter 19a would reflect substantially all of the visible energy received by it, and it may reflect some or all of the laser energy at the first wavelength received by it. However, the filter 19a would reflect only a very low percentage of the laser energy at the second wavelength received by it in that this latter laser energy is highly transmitted by the filter 19. This concept of utilizing filters having different characteristics for removing laser energy at different wavelengths at different stages is equally applicable to the other illustrated embodiments of this invention.

Although in the illustrative examples discussed above, the edge E in FIGS. 2 and 4 separates visible energy from infrared energy, the characteristics of the edge filters could be such that the edge E could be at any desired location in the ultraviolet, visible or infrared spectrums. For example, a sensor operating in a first infrared radiation band could be protected from laser radiation in a second infrared band by using edge filter assemblies in which the edge lies between the two infrared bands.

Although an exemplary embodiment of the invention has been shown and described, many changes, modifications and substitutions may be made by one having ordinary skill in the art without necessarily departing from the spirit and scope of this invention.

I claim:

1. A laser protection device for receiving an incident beam having harmful laser energy wavelengths outside the primary visible range which has all wavelengths from 420 nm to 680 nm and on one side of the primary visible range which side is either below 420 nm or above 680 nm and non-harmful energy wave-lengths within the visible spectrum and for separating the laser energy wavelengths from the non-harmful energy wave-lengths and wherein the harmful laser energy wavelengths are harmful to the eye of an observer or to photosensitive equipment and the non-harmful energy wavelengths are not harmful to the eye of an observer or to photosensitive equipment, said laser protection device comprising:

a first edge filter arranged to receive the incident beam, said first edge filter including means for providing a first reflected beam and a first transmitted beam, one of said beams provided by said first edge filter having a relatively high percentage of the nonharmful energy wavelengths within the visible spectrum and a relatively low percentage of the harmful laser energy wave-lengths outside the primary visible range and the other of said beams provided by said first edge filter having a relatively high percentage of the harmful laser energy wavelengths and a relatively low percentage of the nonharmful energy wavelengths;

a second edge filter arranged to receive said one beam provided by said first edge filter, said second edge filter comprising means for providing a second reflected beam and a second transmitted beam, one of said beams provided by said second edge filter comprising a higher percentage of the nonharmful energy wavelengths than the beam received by said second edge filter and the other of said beams provided by said second edge filter having a higher percentage of the harmful laser energy wavelengths than the beam received by said second edge filter; and each of said edge filters having an edge between the non-harmful energy wavelengths within the visible spectrum and the harmful laser energy wavelengths outside the primary visible range on said one side of the primary visible range.

2. A laser protection device as defined in claim 1 wherein the beams provided by both of said first and second edge filters which contain the relatively high percentages of non-harmful energy wavelengths are the reflected beams.

3. A laser protection device as defined in claim 1 wherein the beams provided by the first and second edge filters which contain the relatively high percentage of non-harmful energy wavelengths are the transmitted beams.

4. A laser protection device as defined in claim 1 including laser energy absorption means having an outer surface which is inclined with respect to and in the path of the beam provided by the first edge filter which contains a relatively high percentage of harmful laser energy wavelengths.

5. A laser protection device as defined in claim 1 wherein the harmful laser energy wavelengths are entirely outside of the visible spectrum.

6. A laser protection device as defined in claim 1 including laser energy absorption means in the path of the beam provided by the first edge filter which contains a relatively high percentage of harmful laser energy wavelengths.

7. A laser protection device as defined in claim 1 including a plurality of additional edge filters serially arranged with the first of said additional edge filters arranged to receive said one beam from said second edge filter, each of said additional edge filters providing a beam which contains a reduced percentage of the harmful laser energy wavelengths as compared with the beam incident upon such edge filter whereby substantially all of the harmful laser energy wavelengths are removed.

8. A laser protection device as defined in claim 1 including a third edge filter substantially coplanar with the first edge filter and arranged to receive said one beam from the second edge filter.

* * * * *